United States Patent [19]

Walker et al.

[11] Patent Number: 4,873,751
[45] Date of Patent: Oct. 17, 1989

[54] FABRICATION OR REPAIR TECHNIQUE FOR INTEGRALLY BLADED ROTOR ASSEMBLY

[75] Inventors: Raymond M. Walker, Port St. Lucie; Donald P. Achor, Stuart; Robert W. Baumgarten, Lake Park; Ralph B. Bogard, North Palm Beach, all of Fla.

[73] Assignee: United Technologies Corporation, Hartford, Conn.

[21] Appl. No.: 289,868

[22] Filed: Dec. 27, 1988

[51] Int. Cl.$^4$ .......................... B21K 3/04; B23P 15/02
[52] U.S. Cl. ................................. 29/156.8 B; 29/23.5; 29/402.13
[58] Field of Search .......... 29/23.5, 156.8 R, 156.8 B, 29/156.8 H, 156.8 T, 156.4 R, 402.08, 402.13, 402.16, 402.21

[56] References Cited

U.S. PATENT DOCUMENTS

| | | | |
|---|---|---|---|
| 3,088,192 | 5/1963 | Turner | 29/156.8 B |
| 3,196,526 | 7/1965 | Amos et al. | 29/156.84 |
| 3,653,110 | 4/1972 | King, Jr. et al. | 29/156.8 B X |
| 3,768,147 | 10/1973 | Berry et al. | 29/156.8 B |
| 3,810,711 | 5/1974 | Emmerson et al. | 29/156.8 H X |
| 4,096,614 | 6/1978 | Brungard et al. | 29/156.8 R |
| 4,285,108 | 8/1981 | Arrigoni | 29/156.8 B |
| 4,364,160 | 12/1982 | Eiwerth et al. | 29/156.8 B X |
| 4,589,176 | 5/1986 | Rosman et al. | 29/156.8 B |
| 4,594,761 | 6/1986 | Murphy et al. | 29/156.8 B X |

*Primary Examiner*—Timothy V. Eley
*Assistant Examiner*—Peter Dungba Vo
*Attorney, Agent, or Firm*—Charles E. Sohl

[57] ABSTRACT

Techniques for fabricating or repairing integrally bladed rotors are developed. A new or replacement blade is bonded to a projecting stub. The new blade has a collar through which bonding forces are transmitted. After bonding with heat and pressure, final machining and heat treatment operations are performed.

3 Claims, 2 Drawing Sheets

FORGE-JOINED BLADE BLOCK MICROSTRUCTURES

Comparison of typical IN100 vs bond line (a) Typical IN100 at blade tip
Mag: 1000X  Kalling's etchant (b) Bond line at mid-chord
Mag: 1000X  Kalling's etchant

FABRICATION OR REPAIR TECHNIQUE FOR INTEGRALLY BLADED ROTOR ASSEMBLY

DESCRIPTION

1. Technical Field

This invention relates to the field of integral bladed rotor fabrication and repair. The invention also relates to the solid state diffusion bonding of superalloys.

2. Background Art

Gas turbine engines are widely used and well developed generators of power used primarily for aircraft propulsion. An overview of gas turbine engine operation includes the compression of air to a high pressure-high temperature condition in a compressor, injection and combustion of fuel with the compressed air and the expansion of the products of combustion through a turbine section which extracts a substantial amount of the energy present in the products of combustion. The turbine section powers the compressor section and in some instances also provides useable external mechanical power.

In large gas turbine engines the compressor section and turbine sections are of axial flow design and each stage comprises a disk having plurality of airfoils mounted on its rim. The blades and the disk move, the disk being mounted on a rotating shaft, and the disk-blade assemblies are subject to very severe environments.

Historically blade and disk assemblies have been produced from separate components wherein a disk has the blades mechanically attached thereto. While this advantageously permits blade and disk to be of different materials, it adds substantially to the weight of the assembly relative to a unitary, integrally bladed rotor assembly.

The increases in the performance requirements for gas turbine engines, particularly military gas turbine engines, are leading to the introduction of integrally bladed rotors wherein the blades are an integral part of the rotor and are either formed integrally with the disk or are metallurgically bonded to the disk. This reduces the weight deficit attributable to the prior art mechanical joining schemes.

A disk and blade assembly might typically comprise a single disk with about 100 blades attached thereto. In the prior art method of assembly employing mechanical joining techniques, it was relatively easy and straight forward to replace damaged blades simply by removing the damaged blade and replacing it with an identical undamaged blade. Obviously in the new environment of integrally bladed rotors, such repairs are far from simple. In the compressor and turbine sections of gas turbine engines, the blades and disks are operated at the outer limits of their property capabilities both in terms of stress and temperature. This means that any repair technique must produce repairs which have the strength of the parent metal, usually the blade material. Other requirements of fatigue resistance, resistance to rupture and the like must also be satisfied.

The need for repairs can arise both in service and in the initial fabrication of disk and blade assemblies. In service it is obvious that damage can arise from a variety of sources and also during the course of fabrication, the odds are fairly good that out of 100 blades typically assembled to a single disk, one or more will have some defect.

There is also a need for a method to initially fabricate integrally bladed rotors by bonding individual blades onto a disk. Consequently, it is an object of the invention to describe a method for repair of integrally bladed rotors. It is another object of the invention to describe a technique which can be used for fabrication of integrally bladed rotors.

DISCLOSURE OF INVENTION

According to a major aspect of the present invention a damaged blade is removed by machining leaving a protruding stub on the disk rim. A repair blade assembly is provided having the requisite dimensions. The repair blade assembly also has a circumferential collar adjacent to the portion of the blade which is to be bonded to the stub.

The repair process is performed under high vacuum conditions. The repair blade is positioned adjacent to the stub and a mechanical force is applied to force the blade end and the stub together in intimate contact. Force is applied to the blade by a tool which acts on the protruding collar. While force is applied between the blade and stub the joint is locally heated to a relatively high temperature by one of several methods including resistance, induction, radiant, and electron beam heating. Resistance heating is desired for practical and economic reasons. The bonding temperature and force are adjusted and controlled so as to produce a metallurgical bond between the blade and the stub. At the conclusion of the bonding process the collar is machined away from the blade as is any material expelled from the joint during the bonding process.

This repair process can also be used to produce integrally bladed rotors ab initio.

The foregoing and other features and advantages of the present invention will become more apparent from the following description and accompanying drawings.

BEST MODE FOR CARRYING OUT THE INVENTION

Figure 1:
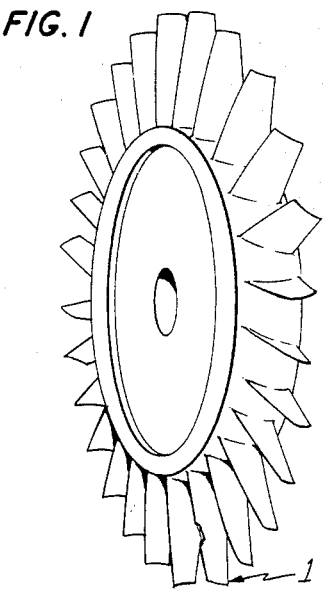
FIG. 1 shows an integrally bladed rotor with a damaged blade.
Figure 2:
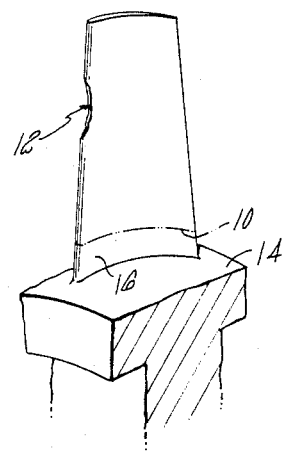
FIG. 2 shows an enlarged view of the damaged blade.
Figure 3:
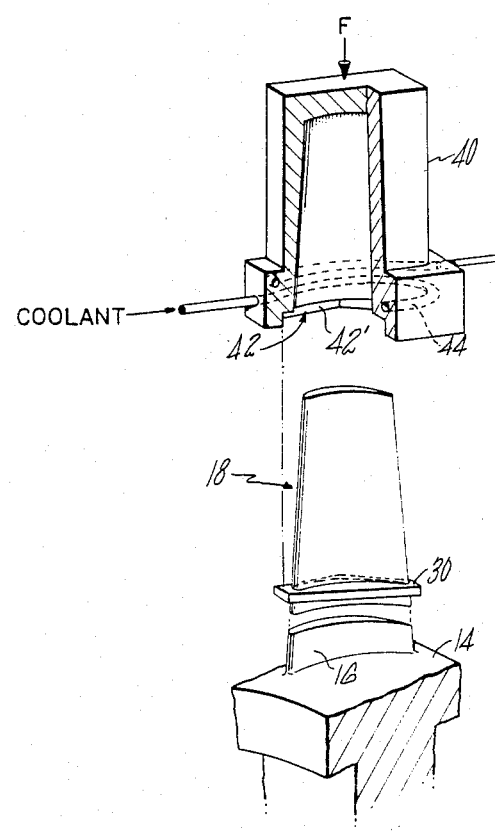
FIG. 3 shows an exploded view of the invention apparatus for blade repair.

The invention will be described with reference to the Figures which specifically illustrate the repair embodiment of the invention. FIG. 1 shows an integrally bladed rotor assembly having a damaged blade 1. FIG. 2 is fragmentary view of a portion of FIG. 1 including the damaged blade 1. The phantom line 10 in FIG. 2 indicates the intended repair bond joint. The repair bond joint is selected to be well away from the damaged area 12, but at the same time should be near the disk surface 14 so as to provide a stub 16. A typical stub height might be 0.1 to 0.2 inch. The removal of the damaged portion of the blade may be done by any conventional technique including mechanical machining, wire EDMing and the like. FIG. 3 is an exploded view showing the stub 16 and the repair blade 18, and the blade gripping tool 40. Notable features of the repair blade 18, are that its cross section generally conforms to the cross section of the damaged blade 1 and that the repair blade 18 has a collar 30 about its circumference, relatively closely adjacent to the intended bond. The repair blade 18 has a cross section at the bond which is a mirror image of the stub 16 cross section. In a production environment there would undoubtedly be several standard repair blade configurations which would be selected to cover a variety of repair requirements.

The shape and location of the collar 30 promotes uniform heating and deformation. The collar 30 (which preferably has straight-line or flat features), working in conjunction with the mating blade gripping tool 40 allows uniform electrical contact (necessary in the case of electrical resistance heating) between the tool 40 and the blade 18 due to the ease of fixturing against the straight and flat collar surface as opposed to attempting uniform contact along a complex contoured airfoil surface. This ensures uniform electrical current flow through the bond zone along the complete width (leading edge to trailing edge) of the airfoil, promoting uniform temperature in spite of the varied thicknesses of the blade. The collar 30 preferably fits into a corresponding relief 42 defined by locating surfaces 42' in the blade gripping tool which, due to the good contact along its length, can act as an efficient heat transfer location adjacent to the bond zone, helping to localize the high temperature region. The dissipation of the heat transferred from the blade collar 30 to the blade gripping tool 40 is accomplished by strategically located water-cooling passages 44 located below (or around) the surfaces of the bond tool in contact with the blade collar 30, designed such that the structural integrity of the blade bond tool is not reduced by excess temperatures. At the same time the tool 40 must be strong enough to resist deformation during bonding.

Water cooling maintains the collar 30 portion of the replacement airfoil 18 at a temperature below the point at which the strength of the alloy would permit deformation. The collar thus remains dimensionally accurate and stable throughout the bond cycle.

The collar 30, being adjacent to the bond zone, allows effective transmission of the force F necessary for bonding without plastic deformation away from the bond, i.e., bending or buckling of the remaining airfoil. This is a critical feature for applications where the airfoil portion beyond the collar is net-shape (finish machined). This also contributes to the dimensional precision of the process.

The collar 30 can provide a transition from the complex, varying thickness of the airfoil shape (which is hard to match from part-to-part) to a simplified shape containing flat surfaces (both in the axial and transverse directions) which are easy to machine during repair blade fabrication and are easy to locate on or against with the blade gripping tool 40 in a reproducible manner during the blade bond set-up.

The collar 30, therefore contains accurate locating surfaces 42 which simplify set-up, and these become ideal features in an automated production system for fabrication of new integrally bladed rotors wherein individual blades are sequentially loaded into the blade bond tool during a fabrication operation accomplished under one vacuum cycle.

Preparation for bonding includes the treatment of the intended bond surfaces to encourage bonding. This chiefly involves the removal of all foreign materials including dirt, grease, oil, etc. and surface oxides. Such surface preparation can be performed by a variety of techniques typically mechanical surface grinding step followed by a chemical etching step.

Bonding typically would be performed in a high vacuum ($10^{-5}$ mm Hg) under conditions of temperature and pressure sufficient to cause metal flow. These conditions will vary obviously depending exactly upon the materials involved. However, for typical superalloys the temperatures will be on the order of 1900° F.–2100° F. and the pressures will be on the order of 15 ksi. In the bonding of typical size blades, having a length for example of between 2 and 3 inches, it would be appropriate to have an upset or a shortening of the repair blade and stub on the order of 0.05 inch during bonding to insure sufficient metal flow to be certain that bonding has occurred. Deformation can also be measured or assessed in terms of the increase of area in the bond joint during the bonding process. In this instance an increase in the bond area of at least 50% and preferably at least 100% will insure that true metallurgical bonding has in fact occurred.

Following the bonding process the part can be removed from the bonding apparatus and the protruding collar and any upset material expelled from the bond joint can be removed from the blade by conventional machining techniques. Following this machining process that portion of the blade which has been bonded can be locally heat treated to ensure adequate mechanical properties.

Figure 4:
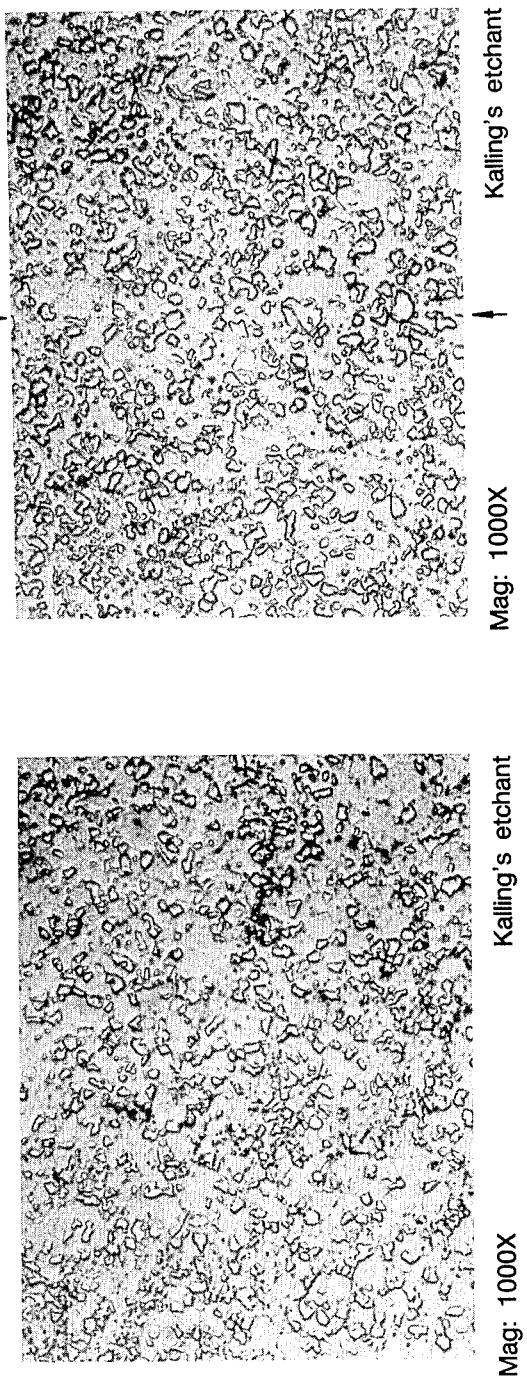
FIGS. 4a and b are photomicrographs illustrating microstructures relating to the invention process.

FIG. 4 illustrates the remarkable bond integrity available with the invention process. FIG. 4 shows two micro structures taken from a repair block bonded according to the invention. The material is that known as IN100 (nominally 10% Cr, 15% Co, 3% Mo, 5.5% Al, 4.7% Ti, 0.18% C, 0.014% B, b 0.06% Zr, 1% V, bal. Ni). FIG. 4a shows the microstructure at the repair blade tip (away from the bond zone) while FIG. 4b shows the microstructure at the bond zone or bond line. The FIG. 4b material was bonded at 1850° F., 15 ksi and then heat treated at 2065° F. one hour (solution treatment), 1400° F. one hour (age) and slow cooled to room temperature. Both figures are photomicrographs taken at 1000× and the similarity is striking. Equally significantly, the bond line cannot be discerned in FIG. 4b. The microstructural uniformity at the bond line suggests that the repaired part will have properties equivalent to those of an original part and mechanical testing confirms this.

Although this invention has been shown and described with respect to detailed embodiments thereof, it will be understood by those skilled in the art that various changes in form and detail thereof may be made without departing from the spirit and scope of the claimed invention.

I claim:

1. A method for replacing a blade on an integrally bladed rotor, which comprises a disk having a plurality of integral blades projecting from the rim of the disk, including the steps of:
   (a) removing a preexisting blade, leaving a stub, a portion of said preexisting blade, projecting from the disk rim, said blade stub having a face which constitutes a surface to which a replacement blade will be bonded;
   (b) positioning a replacement blade adjacent to said stub, said replacement blade having a circumferential collar about its periphery adjacent the proposed bond with the adjacent surfaces of said stub and said replacement comprising an intended bond;

(c) applying a force between said stub and said replacement blade, with said force being applied to the replacement blade through said collar;
(d) locally heating said intended bond, between said stud and said replacement blade, to a temperature which causes softening, metal flow and bonding;
(e) removing said collar from said replacement blade by machining.

2. A method for fabricating an integrally bladed rotor, which comprises a disk having a plurality of integral blades projecting from the rim of the disk, including the steps of:
(a) providing a disk having a plurality of projecting stubs;
(b) providing a plurality of blade preforms, each preform having a circumferential collar about its periphery and orienting said blade preform adjacent a stub;
(c) applying a force between said stub and said blade preform, with said force being applied to the blade preform through said collar;
(d) locally heating said intended bond, between said stub and said blade preform, to a temperature which causes softening, metal flow and bonding to cause bonding and then allowing the bond to cool;
(e) removing said collar from the blade by machining;
(f) repeating steps "c" "d"0 and "e" until all stubs have blades attached thereto.

3. A method as in claim 2 wherein step "e" is performed to multiple blades after said multiple blades have been bonded to stubs.

* * * * *

UNITED STATES PATENT AND TRADEMARK OFFICE
CERTIFICATE OF CORRECTION

PATENT NO. : 4,873,751

DATED : October 17, 1989

INVENTOR(S) : Raymond M. Walker; Donald P. Achor; Robert W. Baumgarten; and Ralph B. Bogard It is certified that error appears in the above-identified patent and that said Letters Patent is hereby corrected as shown below:

Claim 2, column 6, line 11 delete "O" before "and".

Signed and Sealed this

Eighteenth Day of September, 1990

Attest:

HARRY F. MANBECK, JR.

*Attesting Officer*  *Commissioner of Patents and Trademarks*